United States Patent [19]
Fleury

[11] 3,744,300
[45] July 10, 1973

[54] SYSTEM FOR DETERMINING THE FATIGUE OF A STRUCTURE EXPERIENCING VARYING STRESSES

[75] Inventor: Gerard Fleury, Marseille, France

[73] Assignee: Societe Nationale Industrielle Aerospatiale, Paris, France

[22] Filed: Dec. 13, 1971

[21] Appl. No.: 206,999

[30] Foreign Application Priority Data
Dec. 23, 1970  France .............................. 7046433

[52] U.S. Cl. .................................... 73/67.3, 73/91
[51] Int. Cl. ............................................ G01n 3/00
[58] Field of Search ................. 73/88.5 R, 91, 67.3; 235/150.2, 151.3

[56] References Cited
UNITED STATES PATENTS

| | | | |
|---|---|---|---|
| 2,774,535 | 12/1956 | Anderson | 73/88.5 R X |
| 3,354,703 | 11/1967 | Russell, Jr. et al. | 73/88.5 R |
| 3,387,120 | 6/1968 | Funk et al. | 235/150.2 |
| 3,628,377 | 12/1971 | Weiss | 73/91 |

Primary Examiner—Charles A. Ruehl
Attorney—Karl W. Flocks

[57] ABSTRACT

A system for measuring fatigue damage in helicopter blades is based on a determination of the number of force cycles to which the blade is subjected and on the amplitude of the force experienced in each cycle.

11 Claims, 6 Drawing Figures

SYSTEM FOR DETERMINING THE FATIGUE OF A STRUCTURE EXPERIENCING VARYING STRESSES

This invention relates to a system for continuously determining damage to elementary or complex structures subject to repeated and varying stressing, particulary alternate forces such as are caused by vibrations. The invention is applicable inter alia for measuring fatigue damage in the helicopter blades.

It is known that the strength of any structure considerably diminishes after such structure has been subjected to varying loads, more particularly alternating loads, beyond a certain limit. Also, of course, the cumulative effect of loads of this kind is that the structure finally becomes damaged to an extent such that it has zero or negligible strength and may therefore rupture in operation.

A priori determination of applied dynamic loads is carried out fairly often and, more particularly in the case of helicopters, on the basis of rule of thumb or of extrapolations drawn from similar aircraft which have already formed the subject of experiments. In such a case all that calculations of fatigue resistance make possible is a choice of the general dimensions of parts. A more reliable method of estimating strength in operation is needed for elements whose fracture in flight might endanger an aircraft.

As a general rule with such items, full size samples of the critical parts are laboratory tested to destruction to determine their fatigue resistance experimentally. Should this strength be considered satisfactory, the stresses actually encountered in flight are then measured. The fatigue resistance of the parts and the loads which they experience in various flight conditions can then be used to calculate their service life — i.e., the service period after which the parts become completely unserviceable.

Unfortunately, despite all the care taken to measure stresses in flight in characteristic aircraft utilizations, it is impossible to allow for all actual overloads and for the difference in conditions of use of materials according to their assignment and their service area. Consequently, the potential service life of aircraft elements, more particularly helicopter blades, is determined on the basis of an appreciable proportion of a rule of thumb estimation and of factors closely linked to the operative use of the aircraft in tests.

Different devices have been studied to reduce these disadvantages. For instance, means are known which warn and record that particular flight parameters have been exceeded, to indicate that particular parts of an aircraft have experienced forces in excess of normal use limits. Different devices are also known for measuring the acceleration of vibrations and detecting instantaneous vibration overloads of certain parts of aircraft.

Devices of this kind therefore give indications of instantaneous overloading of structures but cannot give any information about actual fatigue damage — i.e., they cannot accurately determine the moment when equipment which has been subject to such loads, more particularly alternate forces whose frequency and peak value vary in random fashion, needs to be replaced.

This invention relates to a system for estimating the total damage to a structure, the system being based on the actual number of force cycles and on the exact amplitude of the load experienced in each cycle.

For a proper understanding of the invention, it should be reminded that according to Wöhler, rupture of a part experiencing a progressively increasing maximum stress $\sigma$ occurs for a continuously decreasing number N of stress applications, the curve (N, $\sigma$) which represents this phenomenon being hyperbolic.

Beyond a critical minimum stress value $\sigma_0$, known as the fatigue limit or more correctly the endurance limit, whose representation is an asymptote of the curve, applying such stress $n$ times damages the part to an extent which can be assessed as the ratio n/N, rupture being likely to occur when the ratio becomes unity.

Also, according to the classical Palmgren-Miner hypothesis, there is a cumulative effect in connection with such damage — i.e., when any given part experiences numbers of cycles $n_1, n_2, n_3 \ldots$ of application of stresses $\sigma_1, \sigma_2, \sigma_3, \ldots$ each of which leads to rupture at numbers of cycles $N_1, N_2, N_3, \ldots$ respectively, the damage limit — i.e., the likely rupture — also appears when :

$$(n_1/N_1) + (n_2/N_2) + (n_3/N_3) \ldots = \Sigma(n/N) = 1$$

The results shown by Wöhler's experimental curves can be expressed mathematically as Wöhler's function which gives the inverse of the number N of cycles causing total damage for a given stress:

$$\frac{1}{N} = \frac{1}{B\sqrt{\frac{A}{x=1}}}$$

in which $A$ and $B$ denote specific coefficients for each material and $x$ denotes the stress level — i.e., the ratio:

$$\sigma/\sigma0 = x$$

When $x \leq 1$ — i.e., when the stress is below the endurance limit — Wöhler's formula ceases to apply — i.e., there is no appreciable damage. For instance, in the case of uncorroded duralumin $A = 0.483$ and $B = \frac{1}{2}$, so that:

$$1/N = [1/(23.3 \cdot 10^{-2})] \cdot (x-1)^2$$

with $x > 1$.

In a fatigue measuring system according to the invention, a variable signal representing instantaneous stresses experienced by the structure goes to at least two parallel channels, a first channel delivering a first signal whose instantaneous value is inversely proportional to the number of cycles corresponding to the total damage to the constituent material of the structure by a stress corresponding to the peak-to-peak amplitude of the stress signal, the first channel delivering a second signal when the stress signal amplitude is below the amplitude corresponding to the endurance limit of the constituent material of the structure, the second channel delivering a third signal proportional to the frequency of the stress signal, the two channels terminating at a circuit arrangement for multiplying together the first and third signals, the output of the circuit arrangement connected to a storage type integrating facility by way of a blocking circuit controlled by the second signal.

In a system of this kind, the first channel delivers an instantaneous voltage $\Delta E_1$ which, in association with an appropriate functions amplifier, can meet Wöhler's formula:

$$\Delta E_1 = \frac{1}{N} = \frac{1}{B \sqrt{\frac{A}{x-1}}}$$

in which $x$ denotes the instantaneous total amplitude of the stress signal, whereas the second channel delivers as instantaneous voltage $\Delta E_2$, the number of cycles $dn$ appearing in the time $dt$. Therefore:

$$dn = \Delta E_2 \cdot dt$$

Applying the Palmgren-miner hypothesis, the damage D can therefore be represented by:

$$D = \sum_0^t \frac{n_1}{N_1} + \frac{n_2}{N_2} \cdots = \int_0^t \frac{dn}{N} = \int_0^t \Delta E_1 \cdot \Delta E_2 \, dt$$

Because of the existence of the second signals controlling the blocking circuit, the instantaneous product of the two voltages $\Delta E_1$, $\Delta E_2$ gives a result which is taken into consideration only if the applied stress is above the endurance limit. However, when the stresses experienced by any part are not isochronous vibrations, the value $D$ also depends upon the time for which the stress is applied and upon variations in the stress before the same reaches a maximum in either sense, whereas in fact fatigue depends only upon the spread between the two maximum stress values.

To obviate this disadvantage, and the first channel comprising means for storing the peak-to-peak amplitude of the variable signal, the system comprises a third channel which, upon storage of the peak-to-peak amplitude, delivers a fourth signal which is of a constant brief duration and which acts via a gate to control the input of the integrator so that the same receives a sample of such amplitude only during the brief fourth signal.

In the system according to the invention, the sensor is, advantageously of the kind comprising resistive stress guages connected up as a Wheatstone bridge. Advantageously, the d.c. or very-low-frequency component of the stress signals is suppressed by a capacitive filter.

Since the stress signal is not usually symmetrical, the stress amplitude must be directly measured peak-to-peak at each stress cycle. Advantageously, therefore, the circuit arrangement has in the corresponding channel two parallel arms or branches each comprising a diode, the two diodes being connected the opposite way round to one another, for charging a storage (memory) capacitor with the amplitude of one alternation, and a pulse-generating circuit arrangement delivers a pulse erasing the charge of the two capacitors at each origin of an AC signal period.

The fourth signal in the third channel can be provided by a mono-stable or by a blocked oscillator which can be triggered by differentiating the total signal so that at every maximum and minimum extreme value of the original signal the differentiated signal passes through zero, and then, by using these edges passing through zero, so that pulses are generated which, after suppression of every other pulse, trigger the monostable.

Advantageously, the terminal storage type integrator is a gas-evolving electrolysis facility, the gases collecting in a reservoir which can be graduated from zero to one; when the value "one" is reached, this is an indication that an order haul is required.

The accompanying drawings will show clearly how the invention can be carried into effect.

Figure 1:
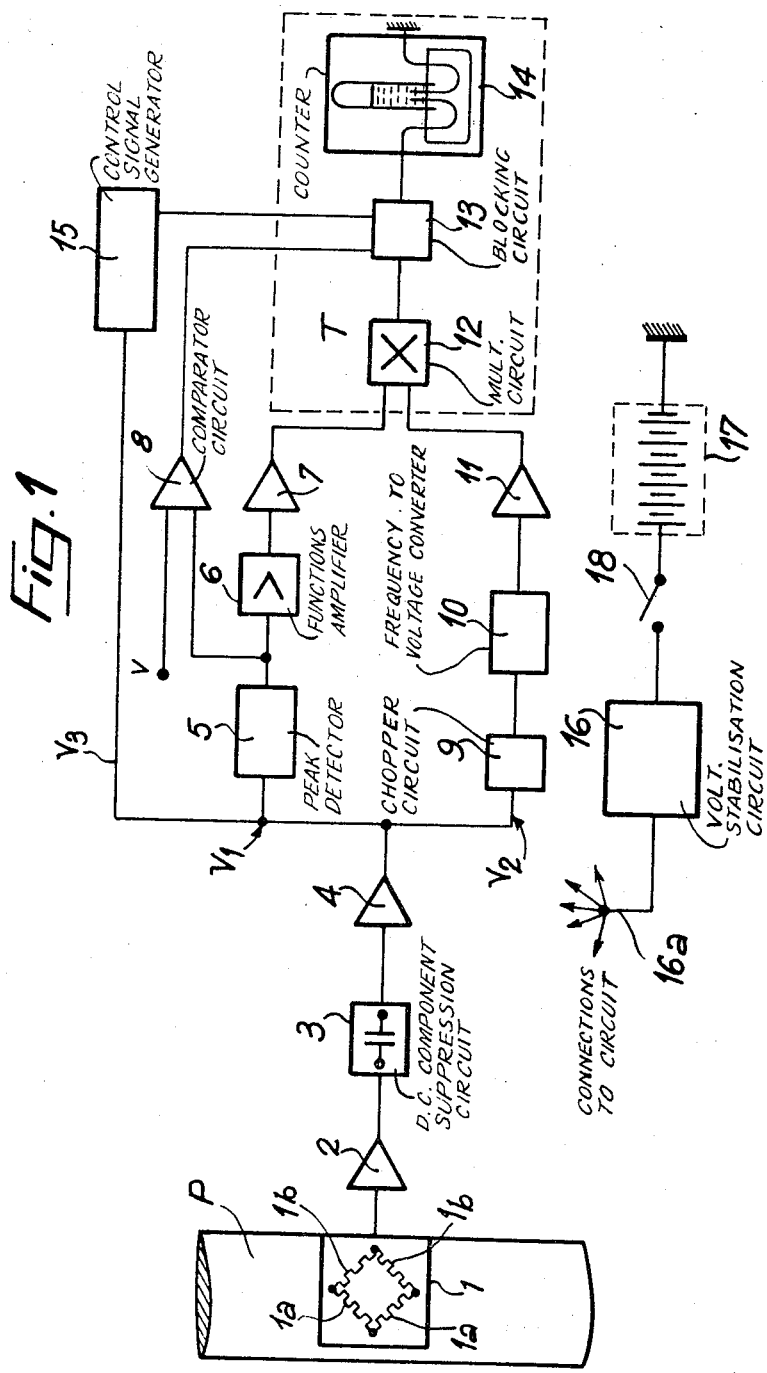
FIG. 1 is a block schematic view of the system.

Referring to FIG. 1, a sensor 1 provides a composite signal which depends upon static forces and dynamic forces experienced by a part P on which sensor 1 has been placed. The signal goes through a linear amplifier 2, the d.c. component corresponding to static stresses is eliminated in a circuit 3, and the signal is then injected in parallel into three channels $V_1$, $V_2$, $V_3$ via a matching amplifier 4. The three channels converge in a common terminal facility T.

Disposed seriatim in the first channel $V_1$ are a lightly damped peak detector 5 determining the peak-to-peak amplitude of the alternating stress, a known function amplifier 6 which, as will be described hereinafter, helps to provide the factor $\Delta E_1 = 1/N$, and a linear amplifier 7 controlling the final level of the signal output from channel $V_1$.

The second channel $V_2$ comprises a chopper circuit 9 connected to a frequency-to-voltage converter 10, these two items helping to sift out factor $\Delta E_2 = dn/dt$. A linear amplifier 11 provides adjustment of the final level of channel $V_2$. The two signals corresponding to $\Delta E_1$ and $\Delta E_2$ respectively are injected into a multiplying operations or multiplier circuit 12 which forms the first element of the common terminal station T. The resulting signal, which is a product of $\Delta E_1$ and $\Delta E_2$, is injected into and integrated in a counter 14 by way of a blocking circuit 13 which keeps out signals corresponding to ratios $x$ less than or equal to 1, since in such cases fatigue damage is nil.

Accordingly, a comparator circuit 8 receives and compares the signal proportional to the peak-to-peak amplitude $x$ provided by peak detector 5 with a reference unit signal $v$, to determine whether the amplitude $x$ is less than or equal to unity, to blocking circuit 13.

Additionally, in order that the terminal integrator (or counter) 14 can provide information independent of the duration of consecutive alternations or of their intermediate variations, a third channel $V_3$ is connected in parallel with the channels $V_1$ and $V_2$ and comprises a control signal generator 15 providing an appropriate brief constant-duration signal which for its duration opens the blocking circuit which is an electronic switch 13.

The various circuits are energized for instance by long-life mercury cells which are grouped in an element 17 and which are connected to the various circuits via a switch 18 and a voltage stabilization circuit 16 which compensates for cell voltage alterations due to the cells discharging. Arrows 16a indicate all necessary connections to the circuit arrangement.

Although most of the facilities are familiar, the following particulars may be useful:

The sensor 1 takes the form of four strain gauges connected up to form a Wheatstone bridge. This bridge which acts in tension and compression, comprises two operative guages 1a and two temperature compensating guages 1b, is energised along one of its diagonals and directs its signals along the other diagonal. The linear amplifier 2 is a means of increasing signal level to provide high-level drive of the subsequent stages. The d.c. component suppression circuit 3 mainly comprises a capacitor. Matching amplifier 4 is an amplifier of the same kind as amplifier 2 and serves to match the impedance of circuit 3 to the subsequent circuits 5, 9, 15 whose inputs are connected in parallel to the output of matching amplifier 4.

Figure 2:
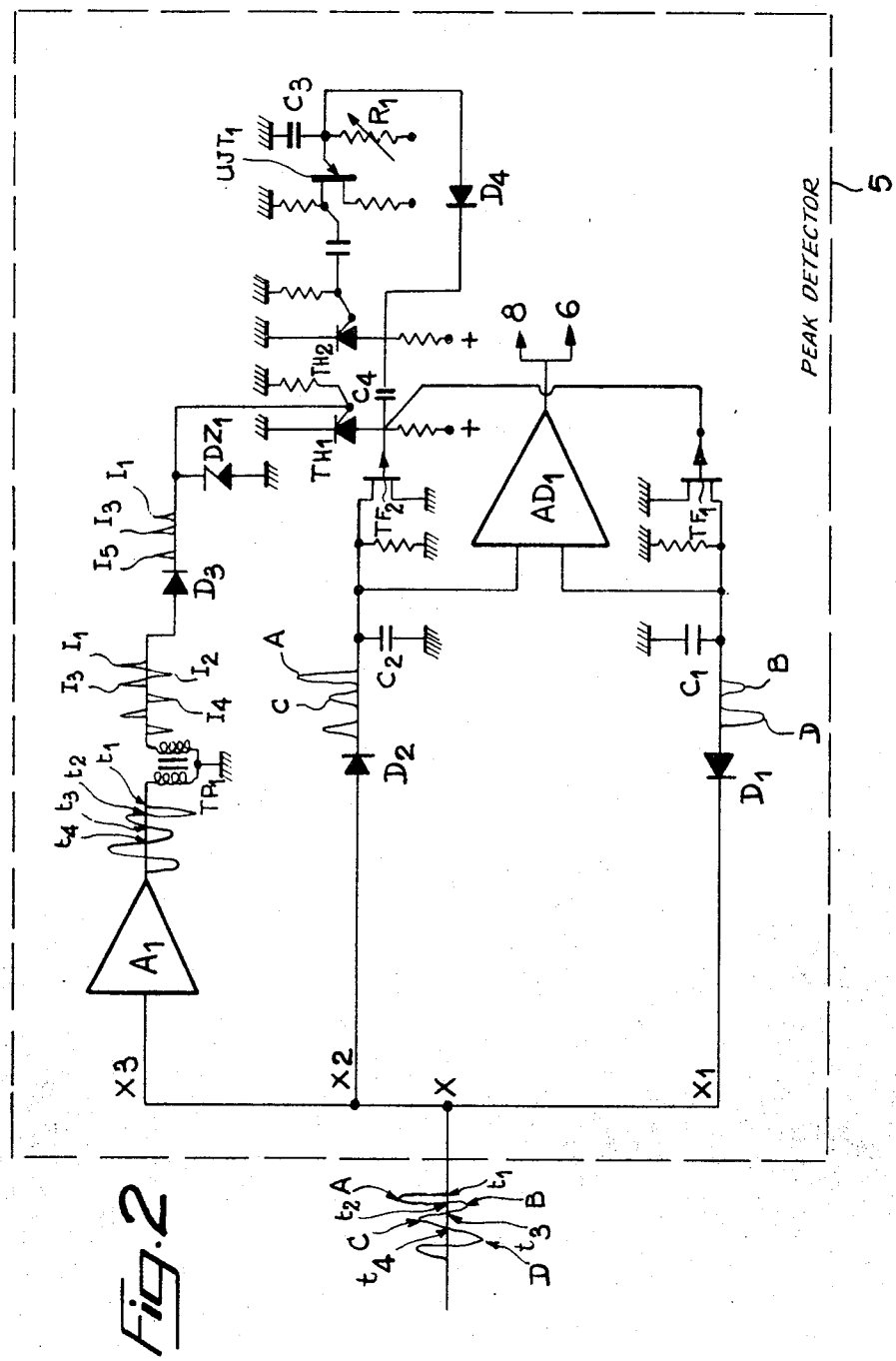
FIG. 2 is a detailed diagram of a peak detection circuit.
Figure 3A:
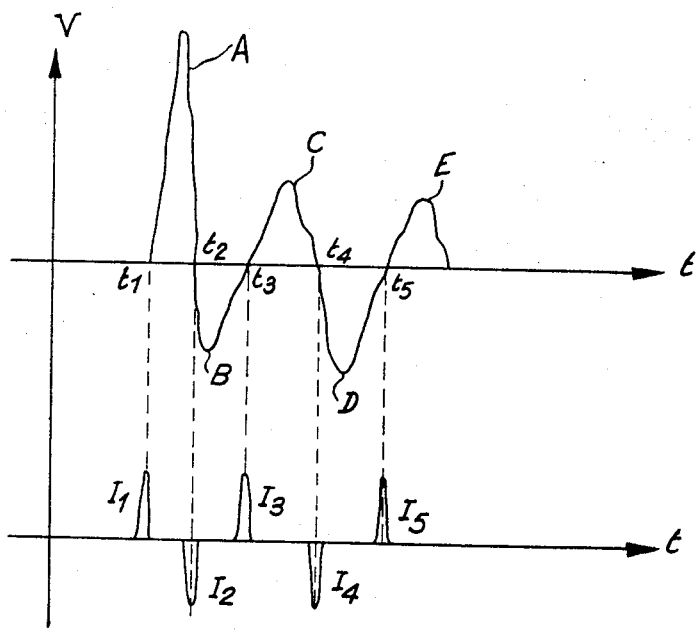
FIGS. 3a, 3b and 4 show signal diagrams.

The peak detector circuit 5 is shown in detail in FIG. 2. Except for isochronous vibrations, the dynamic component of the signal, which can be seen in FIG. 3a, is not usually symmetrical and circuit 5 acts for measuring the peak-to-peak amplitude of the alternating signals of such component. Referring to FIG. 2, the dynamic signal of FIG. 3a is applied from matching amplifier 4 to a connection point X for distribution to channels X1, X2, X3. Diodes D1, D2 in channels X1, X2, separate positive and negative half alternations A, B, C, D . . . so as to charge capacitor C1 negatively and capacitor C2 positively.

Figure 3B:
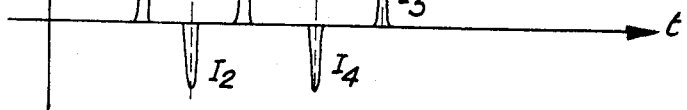

An amplifier A1 in channel X3 inverts and amplifies the signal from matching amplifier 4. The output signal from amplifier A1 is applied to a pulse transformer Tp1 which passes only the leading and trailing edges of the alternations, thus producing a pulse train I1, I2 . . . , as can also be gathered from FIG. 3b. The diode D3 suppresses negative pulses at the output of transformer Tp1. The positive pulses are calibrated by a Zener diode DZ1 which protects the trigger of a thyristor TH1. The latter is connected up in a bi-stable system with a thyristor TH2 by means of a capacitor C4 and is controlled by positive pulses as I1 provided by diode 3 and calibrated by Zener diode DZ1. Hence, the control is accomplished in phase with the passage through zero of the signal to analyze when such signal is increasing — i.e., at the start of a positive alternation.

At switch-on and in the absence of pulses on the trigger of thyristor TH1, a uni-junction transistor UJT1 prepares a pulse after a short time constant, e.g., of 100 microseconds, determined by circuit R1C3. Such pulse operates the trigger of thyristor TH2 which becomes conductive, thus blocking uni-junction transistor UJT1 via diode D4. Thyristor TH1 is cut off, as are transistors TF1, TF2 whose gates are connected in parallel.

When a positive pulse as I1, triggers thyristor TH1, thyristor TH2 cuts off and the bases of transistors TF1, TF2 are earthed, so that the transistors become conductive. Capacitors C1, C2 are fully discharged. The cathode of diode D4 therefore becomes positive, so diode D4 ceases to conduct and capacitor C3 can be charged; after the short time constant (100 microseconds) determined by circuit R1C3, transistor UJT1 opens thyristor TH2 which cuts off thyristor TH1, so that the gates of transistors TF1, TF2 become positive and said transistors cease to conduct.

The cycle is then complete and the two empty and isolated capacitors C1, C2 are again ready to store the next two negative and positive half-alternations of the presenting signal. The voltages of capacitors C1, C2 are applied to differential function amplifier AD1 whose output — which is also the output of circuit arrangement 5 — is connected to amplifier 6 and comparator circuit 8.

In the case, e.g., of a helicopter blade whose vibration half-alternations have a minimum duration of 0.05 seconds (50,000 $\mu$s) and a mean duration of 0.3 seconds (300,000 $\mu$s), the length of the pulses I determined by circuit R1C3 — 100 $\mu$s to give some idea — is negligible. The charge potentials of capacitors C1, C2 therefore truly represent the amplitude of half-alternations such as A, B and so on.

Thus, at time $t1$ pulse I1 discharges capacitors C1, C2 respectively whereafter capacitor C2 stores the peak value of positive half-alternation A. At time $t2$ pulse I2 is cut off by diode D3. The peak value of the next half-alternation B is stored in capacitor C1. At this moment, amplifier AD1 shows at its input the signal peak-to-peak value AB and the corresponding amplified signal reaches comparator circuit 8 and function amplifier 6. At time $t3$ pulse I3 zero resets the stores formed by capacitors C1, C2 and erases therefrom the stored peak-to-peak signal corresponding to AB, so that the capacitors can start to store the peak-to-peak value of signal DC representing the next period.

Figure 4:
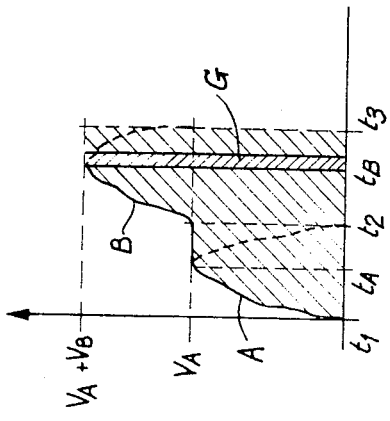

However, the signal at the output of differential amplifier AD1 can be represented by the diagram in FIG. 4. The signal starts at zero at time $t1$, reaches a value VA corresponding to the maximum value of alternation A at time $tA$, remains at the value VA because of the storage capacitor C2, then rises to a value VA + VB at the time $tB$ of the maximum value of alternation B, then remains at the value VA + VB until time t3.

If the VA + VB exceeds the threshold value V, all the energy corresponding to the hatched area is admitted into counter 14. Clearly, this energy depends upon the period of time $t1 - t3$ and upon the pattern of variation of the alternations. If the stresses acting on the structure tested are isochronous vibrations which vary only in amplitude, the indication given by the counter 14 is an exact reflection of the fatigue condition of the structure under test, but if the alternations are not isochronous the fatigue condition indication is wrong since it does not consider merely the value VA + VB.

Figure 5:
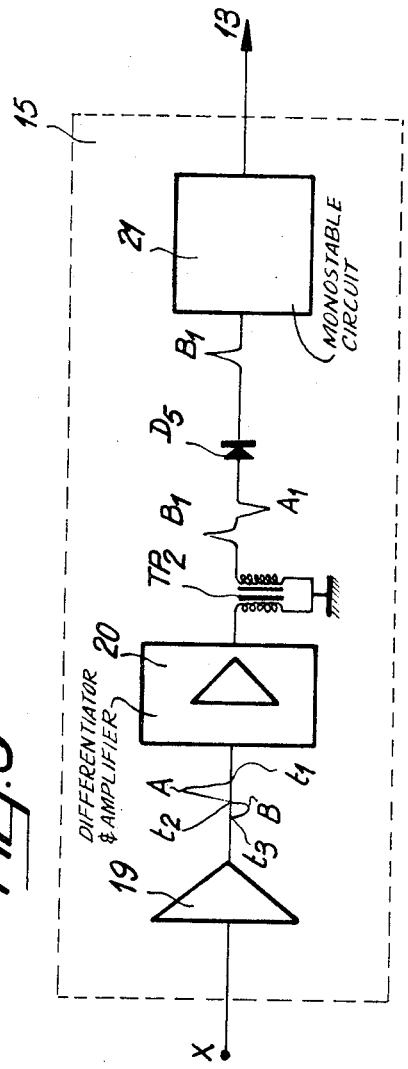
FIG. 5 is a diagram for a circuit transmitting a signal controlling the integrator input.

To obviate this disadvantage, the passage through the time $tB$ is used to trigger a circuit arrangement adapted to deliver a brief constant-duration pulse used to momentarily open the input of counter 14. Consequently, all that enters the counter 14 is a pulse G — i.e., a pulse having this brief constant duration and having exactly the amplitude VA + VB. Another advantage of this construction in the case of an electrolytic integrating counter is that it greatly increases the possible service life of a recorder of this kind or else enables the recorder to be miniaturized. To give some idea, in the embodiment described the duration of pulse G can be 0.01 second (10,000 $\mu$s) — i.e., 20 percent of the shortest half-alternation. Circuit arrangement 15 of FIG. 5 helps to provide this result. The total signal sampled at a place X in FIG. 2 goes to a separating or isolating amplifier 19 similar to amplifier 2, whereafter the signals are derived, then amplified in circuit arrangement 20 so that an edge passing through the zero value of the differentiated signal corresponds to each maximum or minimum of the origin signal alternation. A pulse transformer TP2 similar to transformer TP1 transforms the train of such edges into pulses A1 – B1 whose peaks correspond to the times at which the pulses A and B are passing through their maxima and minima respectively. Diode D5 suppresses negative pulses, so that only positive pulses trigger monostable circuit 21, which provides a brief constant-duration pulse to open the switch of blocking circuit 13. The same can therefore be controlled by an and-gate whose inputs receive the signal from circuit 8 and the signal from monostable circuit 21. Functions amplifier 6 is e.g. of the SPFX kind made by the Philbrik Transconductor Company. By adjustment of a number of potentiometers, it can provide an output voltage which is related to an input voltage by any required transfer function. In the present case the amplifier 6 transcribes the Wohler function, for instance, in the particular case of its application to uncorroded duralumin. Signals of amplitude $x$ from detector 5 go to amplifier 6 which delivers a signal the voltage of which is:

$$g(x) = (x - 1)^2 / 23.3 \cdot 10^{-2}$$

representing the Wöhler function. This signal is applied to the input of linear amplifier 7 by which its amplitude can be checked before it goes to the input of multiplier circuit 12.

Chopper circuit 9 in channel V2 has its input connected to the output of matching amplifier 4 and is an operation amplifier similar to amplifier 2 but arranged as a limiter, thus providing constant-level signals of the same frequency as the signals provided by sensor 1. The level can be preset arbitrarily e.g. to $\sigma_0/2$. The constant-level signals proportional to $\sigma_0$ are applied to the input of the frequency-to-voltage converter 10, which can be a frequency discriminator; a d.c. signal proportional to input signal frequency is therefore available in low-impedance conditions at the output of converter 10. A subsequent amplifier 11 is another linear amplifier similar to amplifiers 2 and 7 and enables the amplitude of the output signal from converter 10 to be checked before going to multiplier circuit 12.

Multiplier circuit 12, for instance, a Philbrick-Nexus Research type 4450 circuit, receives at its inputs the signals from amplifier 7 which are proportional to $\Delta E_1 = g(x)$ and the signals from amplifier 11 which are proportional to $\Delta E_2 = dn/dt$. Multiplier circuit 12 provides signals proportional to the product of $\Delta E_1$ by $\Delta E_2$. Said signals are applied to final counter 14 via blocking counter 13.

The circuit of counter 14 is a miniature electrolytic counter such as a Mercron 204 counter made by Industrial Instruments, with display by a visible central column moving past a scale graduated in extent of damage. Counter 14 automatically integrates and stores all the damage signals and is equivalent to a recorder.

Comparator circuit 8 is a differential amplifier receiving at its inputs the signals from detector 5 which are proportional to $x$ and a reference voltage $v$ proportional to unity. Voltage $v$ is also applied via one of its potentiometers to amplifier 6 so as to form the variable $x - 1$. Comparator circuit 8 therefore provides a d.c. signal output which opens blocking circuit 13 when $x \leq 1$. In this case there is no damage to the part being in test, where by counter 14 should receive no signal, and consequently blocking circuit 13 should be open.

Comparator circuit 8 and monostable circuit 21 both control blocking circuit 13 independently. The same opens or closes the connection between multiplier circuit 12 and counter 14 and can be embodied by any electronic switching circuit.

The invention is applicable to all for complex and elementary structures subject to alternate stressing, more particularly to aircraft parts which can be either rigidly secured to or movable to the fusillage, for instance, helicopter blades.

I claim:

1. A system for measuring fatigue damage in a structure experiencing varying forces comprising
   a sensor means to produce a variable signal representing instantaneous stresses experienced by the structure,
   first channel means to generate a first signal whose instantaneous value is inversely proportional to the number of cycles corresponding to the total damage to the constituent material of the structure by a stress corresponding to the peak-to-peak amplitude of said variable stress signal,
   said first channel means also to produce a second signal when the amplitude of said variable stress signal is below the amplitude corresponding to the endurance limit of the constituent material of the structure,
   second channel means to generate a third signal proportional to the frequency of said variable stress signal,
   said first and said second channel means connected in parallel and to said sensor means,
   multiplier circuit means connected at the termination of said first and second channel means to multiply said first and third signals,
   blocking circuit means connected to said multiplier circuit means and said first channel means to receive said second signal to control said blocking circuit means,
   a storage type integrating means connected to said blocking circuit means.

2. The system for measuring fatigue damage of claim 1, further characterized by
   said first channel means including
   peak detector means to detect and store peak-to-peak amplitude of said variable stress signal,
   and third channel means to deliver upon storage of said amplitude, a fourth signal of brief constant duration controlling said blocking circuit means to allow only the value stored during said brief constant duration to enter said integrating means.

3. The system for measuring fatigue damage of claim 2,
   said third channel means including
   means to derive and amplify said variable stress signal,
   pulse transforming means connected to receive and differentiate the derived and amplified signal,
   rectifying means to suppress the negative pulses connected to said pulse transforming means,
   generating means to generate said fourth signal connected to said rectifying means.

4. The system for measuring fatigue damage of claim 2,
   said blocking circuit means including
   an AND gate connected to receive said second and fourth signals,
   and an electronic switch controlled by said AND gate.

5. The system for measuring fatigue damage of claim 1, further characterized by said sensor means including
  a Wheatstone bridge connected stress guage sensor,
  a linear amplifier connected to said sensor,
  a mainly capacitive filter connected to said amplifier,
  and matching circuit means to adapt above-mentioned circuitry to said channel means.

6. The system for measuring fatigue damage of claim 1,
said first channel means including
  peak detector means to detect and store peak-to-peak amplitude of said variable stress signal having an output of rectified signals proportional to the peak-to-peak value of two consecutive alternations,
  and a functions amplifier means to prepare said first signal from said rectified signals in dependence upon the amplitude thereof.

7. The system for measuring fatigue damage of claim 6,
said first channel means also including
  comparator circuit means having inputs to receive said rectified signals and a reference voltage representing the endurance limit of the material, and an output of said second signal when said rectified signals are below the reference voltage,
  and said blocking circuit means including an electronic switch.

8. The system for measuring fatigue damage of claim 6,
said peak detector means including
  two capacitors,
  two diodes connected the opposite way around to one another with one of said diodes connected to one of said capacitors and the other of said diodes connected to the other of said capacitors,
  difference amplifier means to deliver a signal proportional to the sum of the absolute capacitor-charging voltages having inputs connected one each to said two capacitors with said inputs being grounded,
  electronic relay means connected to said capacitors to discharge the corresponding said capacitor,
  an electronic bistable means to render said electronic relay means conductive by the leading edges of the positive alternations of said variable stress signal and non-conductive by a short time base triggered by the same edge.

9. The system for measuring fatigue damage of claim 8,
said peak detector means further including
  an inverting amplifier means to receive the variable stress signal,
  a pulse transformer connected to said inverting amplifier,
  a positively conducting diode connected to said transformer,
  a Zener diode connecting said positively conducting diode to ground,
  said electronic bistable means connected to said positively conducting diode and said Zener diode,
  whereby said variable stress signal has the leading edges of the positive alternations converted into pulses thereby.

10. The system for measuring fatigue damage of claim 1,
said second channel including
  limiting amplifier means to clip said variable stress signal to a value proportional to the endurance limit of the constituent material of the structure,
  and a frequency-to-voltage converter connected in cascade to said limiting amplifier means.

11. The system for measuring fatigue damage of claim 1,
said storage type integrating means including
  an electrolytic counter graduated from zero to one and having a visual indicator.

* * * * *